US010628417B2

(12) United States Patent
McKenna et al.

(10) Patent No.: US 10,628,417 B2
(45) Date of Patent: Apr. 21, 2020

(54) PHYSICAL PLANNING OF DATABASE QUERIES USING PARTIAL SOLUTIONS

(71) Applicant: ParAccel LLC, Campbell, CA (US)

(72) Inventors: William J. McKenna, Oceanside, CA (US); Richard L. Cole, Los Gatos, CA (US)

(73) Assignee: ParAccel LLC, Palo Alto, CA (US)

( * ) Notice: Subject to any disclaimer, the term of this patent is extended or adjusted under 35 U.S.C. 154(b) by 67 days.

(21) Appl. No.: 14/522,876

(22) Filed: Oct. 24, 2014

(65) Prior Publication Data

US 2015/0154256 A1 Jun. 4, 2015

Related U.S. Application Data

(60) Provisional application No. 61/910,396, filed on Dec. 1, 2013.

(51) Int. Cl.
*G06F 16/2453* (2019.01)

(52) U.S. Cl.
CPC .............. *G06F 16/24542* (2019.01)

(58) Field of Classification Search
CPC ......... G06F 17/30463; G06F 17/30433; G06F 17/30474
USPC ................ 707/718, 803, 722, 759; 382/305; 714/49; 705/5
See application file for complete search history.

(56) References Cited

U.S. PATENT DOCUMENTS

| | | | | |
|---|---|---|---|---|
| 5,600,831 A | * | 2/1997 | Levy ................. | G06F 17/30433 |
| 5,655,116 A | * | 8/1997 | Kirk .................. | G06F 17/30433 |
| 6,615,201 B1 | * | 9/2003 | Seshadri ............. | H04L 41/0213 |
| 7,984,043 B1 | * | 7/2011 | Waas ................. | G06F 17/30932 707/718 |
| 8,838,593 B2 | * | 9/2014 | Apanowicz ......... | G06F 17/30448 707/736 |
| 9,922,344 B1 | * | 3/2018 | Christophe ......... | G06Q 30/0256 |
| 2002/0143587 A1 | * | 10/2002 | Champernowne ..... | G06Q 10/02 705/5 |
| 2003/0158842 A1 | * | 8/2003 | Levy ................. | G06F 17/30445 |

(Continued)

OTHER PUBLICATIONS

Chaudhuri, S., "An Overview of Query Optimization in Relational Systems", In Proc. of ACM Symposium on Principles of Database Systems (PODS), 1998, 11 pages.

(Continued)

*Primary Examiner* — Amresh Singh
(74) *Attorney, Agent, or Firm* — Fenwick & West LLP

(57) ABSTRACT

A database system determines execution plans for database queries by evaluating a number of partial solutions for each database query. The database system determines a partial solutions limit on the number of partial solutions to be evaluated for determining the execution plan of the query. The database system determines a plurality of partial solutions, each partial solution corresponding to a portion of the execution plan for processing the database query. The database system evaluates a number of candidate partial solutions for determining a partial solution. The number of candidate partial solutions evaluated is determined based on the partial solutions limit. The database system combines the plurality of partial solutions to obtain an execution plan for the database query. The database system executes the database query by executing the execution plan.

25 Claims, 6 Drawing Sheets

(56) References Cited

U.S. PATENT DOCUMENTS

| | | | |
|---|---|---|---|
| 2004/0006561 A1* | 1/2004 | Nica | G06F 17/30466 |
| 2005/0240570 A1* | 10/2005 | Ozbutun | G06F 17/30457 |
| 2006/0112090 A1* | 5/2006 | Amer-Yahia | G06F 17/3053 |
| 2006/0136368 A1* | 6/2006 | Young-Lai | G06F 17/30412 |
| 2006/0218123 A1* | 9/2006 | Chowdhuri | G06F 17/30445 |
| 2007/0073642 A1* | 3/2007 | Ghosh | G06F 17/30463 |
| 2007/0250473 A1* | 10/2007 | Larson | G06F 17/30457 |
| 2008/0177694 A1* | 7/2008 | Chaudhuri | G06F 17/30463 |
| 2008/0240619 A1* | 10/2008 | Kanawa | G06F 17/27 382/305 |
| 2008/0243449 A1* | 10/2008 | Feblowitz | G06F 8/10 703/2 |
| 2008/0281784 A1* | 11/2008 | Zane | G06F 17/30463 |
| 2009/0100004 A1* | 4/2009 | Andrei | G06F 17/30424 |
| 2010/0125565 A1* | 5/2010 | Burger | G06F 17/30433 707/713 |
| 2010/0125574 A1* | 5/2010 | Navas | G06F 17/30516 707/722 |
| 2010/0306188 A1* | 12/2010 | Cunningham | G06F 17/30463 707/713 |
| 2011/0131199 A1* | 6/2011 | Simon | G06F 17/30463 707/714 |
| 2011/0145221 A1* | 6/2011 | Kim | G06F 17/30463 707/718 |
| 2011/0282812 A1* | 11/2011 | Chandramouli | G06N 99/005 706/12 |
| 2011/0313999 A1* | 12/2011 | Bruno | G06F 17/30454 707/718 |
| 2012/0059838 A1* | 3/2012 | Berntson | G06F 17/30864 707/759 |
| 2012/0089596 A1* | 4/2012 | Siddiqui | G06F 16/24542 707/718 |
| 2012/0221591 A1* | 8/2012 | Yerneni | G06F 17/30867 707/769 |
| 2013/0086039 A1* | 4/2013 | Salch | G06F 17/30463 707/717 |
| 2013/0097599 A1* | 4/2013 | Konik | G06F 9/455 718/1 |
| 2013/0232176 A1* | 9/2013 | Plattner | G06F 17/30289 707/803 |
| 2013/0268520 A1* | 10/2013 | Fisher | G06F 17/30554 707/723 |
| 2014/0195558 A1* | 7/2014 | Murthy | G06F 17/30545 707/770 |
| 2014/0229221 A1* | 8/2014 | Shih | G06Q 10/06313 705/7.23 |
| 2014/0281748 A1* | 9/2014 | Ercegovac | G06F 11/0727 714/49 |
| 2015/0142732 A1* | 5/2015 | Pace | G06F 17/30256 707/609 |

OTHER PUBLICATIONS

Ono, K. et al., "Measuring the Complexity of Join Enumeration in Query Optimization," Proceedings of the 16th Very Large Data Bases (VLDB) Conference, Brisbane, 1990, pp. 314-325.

* cited by examiner

PHYSICAL PLANNING OF DATABASE QUERIES USING PARTIAL SOLUTIONS

CROSS REFERENCE TO RELATED APPLICATION

This application claims the benefit of U.S. Provisional Application No. 61/910,396 filed on Dec. 1, 2013, which is incorporated by reference in its entirety.

BACKGROUND

Databases store large amount of data that is processed in response to database queries. Typically databases generate an execution plan for the queries. The execution plan comprises various operators and order of execution of these operators to process the database query. A database query optimizer typically evaluates several execution plans to select a particular query plan for execution. The query optimizer selects the query plan that the optimizer determines as the best query plan for executing the database query. An execution plan is also referred to herein as a physical plan, a query plan, or a plan.

Generating the optimal query plan is a complex process that can take significant amount of time and resources depending on the complexity of the query being optimized. The number of execution plans that are possible for a complex query can be very large. An optimizer attempts to find the optimal query plan from this large number of query plans. However, finding the optimal plan can be a complex and resource consuming process. Query optimizers typically use heuristics to find an execution plan fast even if the execution plan may not be optimal. However, as a result, optimizers can make incorrect decisions while generating the execution plan for a query. If the optimizer makes incorrect decisions while generating the execution plan for a query, the execution of the query can be significantly slow compared to an optimal plan.

SUMMARY

Embodiments of the invention determine execution plan for a database query by evaluating a number of partial solutions for the database query. A database system receives a request for generating an execution plan for a database query. The database system determines a partial solutions limit on the number of partial solutions to be evaluated for determining the execution plan of the query. The database system determines a plurality of partial solutions, each partial solution corresponding to a portion of the execution plan for processing the database query. The database system determines each partial solution by evaluating a number of candidate partial solutions, wherein the number of candidate partial solutions is determined based on the partial solutions limit. The database system combines the plurality of partial solutions to obtain an execution plan for the database query. The database system executes the database query by executing the execution plan.

In an embodiment, the database system determines the partial solutions limit based on the complexity of the query. For example, the partial solutions limit may be determined based on a function that is inversely proportionate to the measure of complexity of the database query. The database system may determine the measure of complexity of the database query based on an estimate of the number of feasible joins of the database query. In an embodiment, the database system determines the measure of complexity of the database query to be higher for database queries with higher number of feasible joins.

The features and advantages described in this summary and the following detailed description are not all-inclusive. Many additional features and advantages will be apparent to one of ordinary skill in the art in view of the drawings, specification, and claims.

Figure 1:
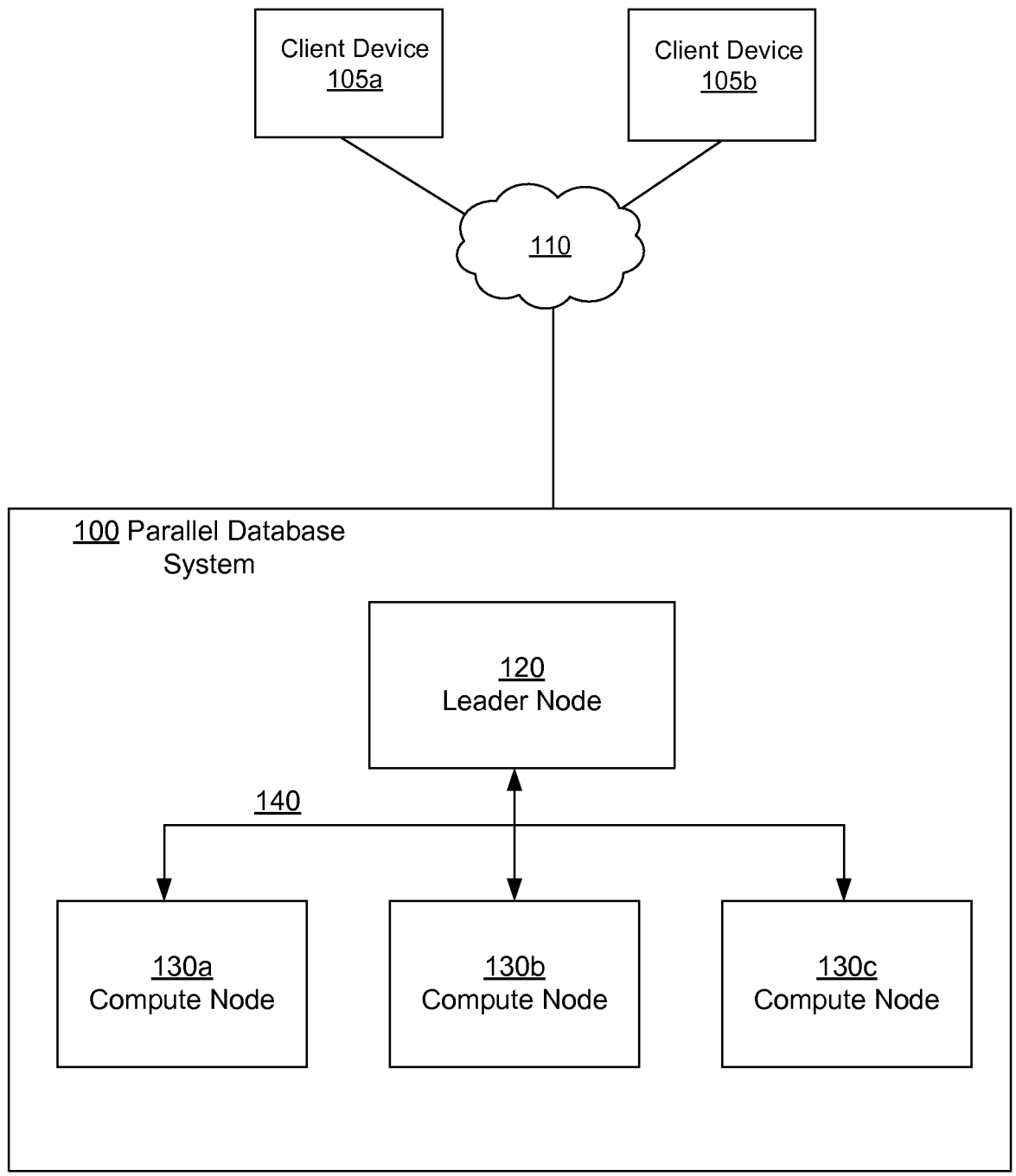
FIG. 1 shows the architecture of a database system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Databases allow users to interact with the data stored in the database using a query interface or language, for example, the structured query language (SQL) interface. The SQL language allows users to specify database queries for accessing and manipulating data from a database system. A query optimizer generates execution plans for the database queries and sends the execution plans to an execution engine for execution. The query optimizer enumerates several plans choices and evaluates these plan choices to select an execution plan for executing the database query.

An execution engine implements physical operators, for example, hash join, sort merge join, index scan, etc. A physical operator produces an output data set from one or more input data sets. The complete set of physical operators for executing a database query and the relationships between the operators is referred to as an execution plan. There can be a large number of ways in which a query can be executed. In other words a query can have a large number of execution plans. The query optimizer may enumerate these execution plans to select a plan for executing the query. The query optimizer determines a measure of cost for each plan based on certain criteria. These criteria typically determine the amount of computing resources required for executing a query. An execution plan that requires large amount of resources may be associated with higher cost. The query optimizer attempts to minimize the cost of the execution plan selected for a query.

The set of execution plans that can be used to execute a query is also referred to as the search space through which the query optimizer searches. The search space includes execution plans obtained by transforming the query to other equivalent forms and different operators that achieve the result of the query. The efficiency of a query optimizer depends on how the query optimizer performs searches through the search space of execution plans.

Embodiments use top-down physical planning to perform logical to physical algebra mapping based on cost of execution plans. The database system identifies a logical expression corresponding to an input database query and its logically equivalent expressions. All expressions that are logically equivalent to an expression form an equivalence class. For example, if a database query has a logical expression joining tables t1, t2, and t3, the logical expressions ((t1 join t2) join t3) and ((t1 join t3) join t2) are expressions that are equivalent to the logical expression of the database query and belong to an equivalence class. Embodiments identify goals associated with a database query for the optimizer. A goal comprises a logical expression together with a set of required physical properties, for example, sort order, distribution etc., and a cost bound. For a given goal, a number of partial solutions satisfying the current goal are considered.

Embodiments are described using parallel database system. However techniques disclosed herein are applicable to database systems that execute on single processor machines. Certain operators applicable to parallel database systems may not be applicable to single processor architectures, for example, distribution of data across processors.

Partial Solutions

A solution to the problem of optimization of a query provides the complete details of the execution plan that the optimizer determines as being optimal for the query. To determine the complete optimization solution for a query, embodiments process various portions of the query and optimize the various portions independently and combine them to obtain the complete solution. If a portion of a query is optimized, only some of the attributes of the overall solutions are determined.

A portion of a query corresponds to a computation performed while processing the query. For example, a query may specify a join of a set of tables, and a portion of the query may correspond to a join of a subset of the set of tables. A portion of a query may also correspond to a portion of the query plan or execution plan for processing the query. For example, a portion of the execution plan may correspond to determining the join of the subset of tables. The result of optimization of a portion of a query (or a computation performed as part of the processing of the query, or a portion of the execution plan of the query) is called a partial solution (PS).

In other words, a partial solution is a physical operator coupled with child search goals that can possibly satisfy a required search goal. Embodiments heuristically limit the number of partial solutions considered during top-down cost-based physical planning. Mechanisms described herein determine a limit on the number of partial solutions that are considered for a query or a portion of a subquery to determine an execution plan for that query or portion of the query. The limit on the number of partial solutions is also referred to herein as partial solutions limits (PSL). PSLs are used to restrict the optimizer search space for complex queries with a large number of physical plan alternatives.

For examples illustrated herein, example tables are t1, t2, t3, ..., tn, where table t1 has columns a1, b1, c1, table t2 has columns a2, b2, c2, table t3 has columns a3, b3, c3, and so on unless indicated otherwise. An example of a goal in a parallel environment is as follows. The logical expression joins tables t1 and t2 with join predicate (a1=a2). The cost bound is assumed to be 100. And the required physical properties for this goal are that the result is sorted on a1 and distributed on a1. Many partial solutions can satisfy this goal.

A first partial solution uses the merge join physical operator for joining the tables. The required physical properties of child 0 corresponding to table t1 are sorted on a1, distributed on a1. The required physical properties of child 1 corresponding to table t2 are sorted on a2 and distributed on a2.

A second partial solution also uses the merge join physical operator for joining the tables. The required physical properties of child 0 corresponding to table t1 are sorted on a1, distributed on a1. The required physical properties of child 1 corresponding to table t2 are sorted on a2 and table t2 is broadcast.

A third partial solution uses the hash join physical operator for joining the tables. The required physical properties of child 0 corresponding to table t1 are sorted on column a1 and distributed on column a1. The required physical properties of child 1 corresponding to table t2 are any sort order and distributed on column a1.

A fourth partial solution uses the sort physical operator for joining the tables. The required physical properties of child 0 corresponding to a join of tables t1 and t2 with join predicate (a1=a2) and required physical properties are any sorted order and distributed on column a1.

Each partial solution is assigned a rank. In an embodiment, the rank is a heuristic measure of how likely the partial solution is to lead to the plan with the lowest cost. A partial solution that is likely to cause significant amount of data to be moved across a parallel architecture is ranked lower than an alternative partial solution that does not cause such data movement. For example, if table t1 is sorted and distributed on a1, and table t2 is sorted and distributed on a2, then the first partial solution described above should be assigned a high rank so it is considered before the other partial solutions. This is so because in this configuration, all joins are co-located and the tables are already sorted on the join keys, making merge join a very efficient physical operator). Similarly, if t2 is very large compared to t1 then the second partial solution described above is likely to be very inefficient because a broadcast of a large table will have a high relative cost. In this case, the second partial solution should be assigned a low rank so it is considered after more promising partial solutions.

In an embodiment, if a partial solution is obtained with a low cost, the remaining candidates of partial solutions may be eliminated if cost measure indicates they have higher cost than the low cost partial solution. The fact that a partial solution has cost greater than the low cost may be determined without fully evaluating the cost of the partial solution, for example, if a subset of a partial solution exceeds the low cost value there is no need to evaluate the overall cost of the partial solution since it is only going to be higher than the cost calculated so far.

Embodiments order partial solutions sets (PSSs) by rank and explore them in rank order. This improves search performance because lower cost plans are more likely to be found earlier during the search than without ordering. This results in better branch-and-bound pruning performance.

For complex queries, a very large number of partial solutions are possible, especially when the number of physical properties is large. For example, in a shared-nothing parallel environment there are additional physical properties contributing to increase in the number of physical properties compared to single processor architectures. Embodiments limit the amount of time the top-down mapping algorithm spends searching for a low cost plan by heuristically pruning the partial solution sets based on partial solution rank.

In an embodiment, a limit is determined for the number of partial solutions considered for a query based on the complexity of the query being processed. The complexity of a query may be determined based on factors including the type and structure of query, for example, the number of join expressions required to express the entire logical search space of the query. The logical search space represents each equivalence class once. In other words, all logically equivalent solutions are represented by the same equivalence class.

The complexity of a query may also be determined by considering the number of joins required to express the physical search space for the query. In the physical search space, different variations of a logical expression based on physical characteristics (e.g., distribution of tables or intermediate results, sets of columns used for distributing tables or intermediate results, types of join algorithm used, etc.) are represented separately. The physical search space is larger than the logical search space since each logical expression may correspond to multiple physical expressions. In an embodiment, the number of partial solutions considered for a query is limited to a smaller value if the complexity of the query is determined to be high. In other words, the limit on the number of partial solutions considered for a query is determined to be a value inversely proportionate to a measure of complexity of a query.

The mechanisms described herein allow the query planner to throttle back the efforts of selecting each partial solution for a sub-goal when the complexity of the query is high. In some embodiments a user, for example, a system administrator may provide information for configuring the amount by which the query planner throttles back. For example, the system administrator may provide a measure of rate at which the partial solutions limit is increased as the complexity of the queries increases. Alternatively, the system administrator may disable the application of the partial solutions limit by specifying that the partial solution limit should not be applied, no matter what the complexity of the queries.

Parallel Database System

FIG. 1 shows the overall system environment illustrating the architecture of a parallel database system 100, in accordance with an embodiment of the invention. The parallel database system 100 has four main architectural components: a leader node 120, one or more compute nodes 130, a parallel communication fabric 140, and an optional storage area network (SAN) (not shown in FIG. 1). (A letter after a reference numeral, such as "130a," indicates that the text refers specifically to the element having that particular reference numeral, while a reference numeral in the text without a following letter, such as "130," refers to any or all of the elements in the figures bearing that reference numeral.)

Although the system described herein is a parallel database system, techniques disclosed herein apply to a database system that is executed using a single processor. The leader node 120 controls the execution of the compute nodes 130. All nodes 120, 130 communicate with each other via the parallel communication fabric 140. The leader node 120 and the compute nodes 130 can comprise any type of processor, for example, standard x86 servers running Linux or multi-core systems. Users and applications may communicate with the system via the leader node by using standard interfaces, ANSI SQL via ODBC/JDBC (in general, "the system" or "database system" or "database" refers to a parallel database system 100 herein.)

The leader node 120 may be connected to the network 110 and may interface with external applications and other computers using the network. A leader node manages communications with the compute nodes. In an embodiment, the leader node controls sessions, parsing and optimizing queries, and scheduling execution of the workload. The leader node may or may not participate in data operations. The leader node may be optimized for outward communication and handling of query overhead so the resources of the compute nodes are utilized for performing data operations.

Compute nodes 130 are the components of the parallel database system 100 that perform processing and storing of data. Each compute node 130 stores and manages a subset of rows of each table. For example, if a table has 1 billion rows and there are 20 compute nodes, then approximately 50 million rows are distributed to each compute node 130.

Data may be distributed to a particular compute node 130 based on a particular data distribution strategy, for example, based on a hashing algorithm applied to a distribution key, or by round robin. Distribution keys, such as the primary key or other popular join column may be used for even distribution of data, especially when queries are likely to benefit from collocated joins by using the same distribution key. In cases where an inherently balanced distribution key isn't obvious or doesn't exist, round robin distribution may be used to balance the data.

By utilizing multiple methods of data distribution, it is possible to maintain the appropriate balance between data distribution and performance so the parallel database system 100 can take best advantage of its resources and provide good parallel efficiency. The performance of the parallel database system 100 is driven by the number of compute nodes 130 present. For example, with most applications, a 50-compute node system may perform almost 5× faster than a 10-compute node system.

Each compute node 130 depends on a set of processes to manage resources of that node, for example, communication, and secondary storage. In order to achieve maximum parallelism, the parallel database system 100 logically partitions data for all tables into multiple subsets per node so that multiple cores can be used to process the data for those tables during queries. These logical partitions are referred to as "slices", and in an embodiment, the number of slices per node is typically configured to correspond to the number of cores per node. Each slice is given a set of query execution processes at system startup, and parallelism is achieved by having the processes of all slices competing for the node's shared resources. Slices communicate with other slices via the communication fabric, but they may not be directly accessed by end user applications. In certain contexts, a slice refers to the portion of data that is allocated to a process (or core) for processing.

In an embodiment, the communication fabric 140 is a high performance fabric based on standard, 1 or 10 Gigabit Ethernet (GbE) and standard multi-port switches that have full crossbar support. The communication fabric 140 may use a custom protocol to enable highly efficient communication among each of the nodes (leader and compute). The communication fabric 140 delivers maximum interconnect performance because it is specifically designed for how traffic moves in a complex, parallel database environment. For example, communication fabric 140 is configured to efficiently handle movements of large intermediate result sets, data redistribution, low rate of packet loss and so on. In some embodiments, communication fabric 140 uses multiple links simultaneously running multiple data streams. The communication fabric 140 is implemented internally as multiple independent networks all communicating data for the parallel database system 100. In some embodiments, two GbE fabrics may be used for high availability. In other embodiments, the parallel database system 100 can utilize as many communication fabrics 140 as are available for increased performance.

Client devices 105 are computing devices that execute client software, e.g., a web browser or built-in client application, to interact with the parallel database system 100 via a network. Note that the terms "client" or "client device," as used herein may refer to software providing respective functionality, to hardware on which the software executes, or to the entities operating the software and/or hardware, as is apparent from the context in which the terms are used. For example, a client device 105 may execute business intelligence software or analytic tools that send interact with a database system.

In one embodiment, the client device 105 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 105 can be any device having computer functionality, such as a personal digital assistant (PDA), mobile telephone, smartphone, etc. In an embodiment, a client of the database system can be another process, for example, a web server that serves queries from remote devices.

The interactions between the client devices 105 and the parallel database system 100 are typically performed via a network 110, for example, via the internet. The network 110 enables communications between the client device 105 and the parallel database system 100. In one embodiment, the network 110 uses standard communications technologies and/or protocols. In another embodiment, the entities can use custom and/or dedicated data communications technologies instead of, or in addition to, the ones described above. Depending upon the embodiment, the network 110 can also include links to other networks such as the Internet.

System Architecture

Figure 2:
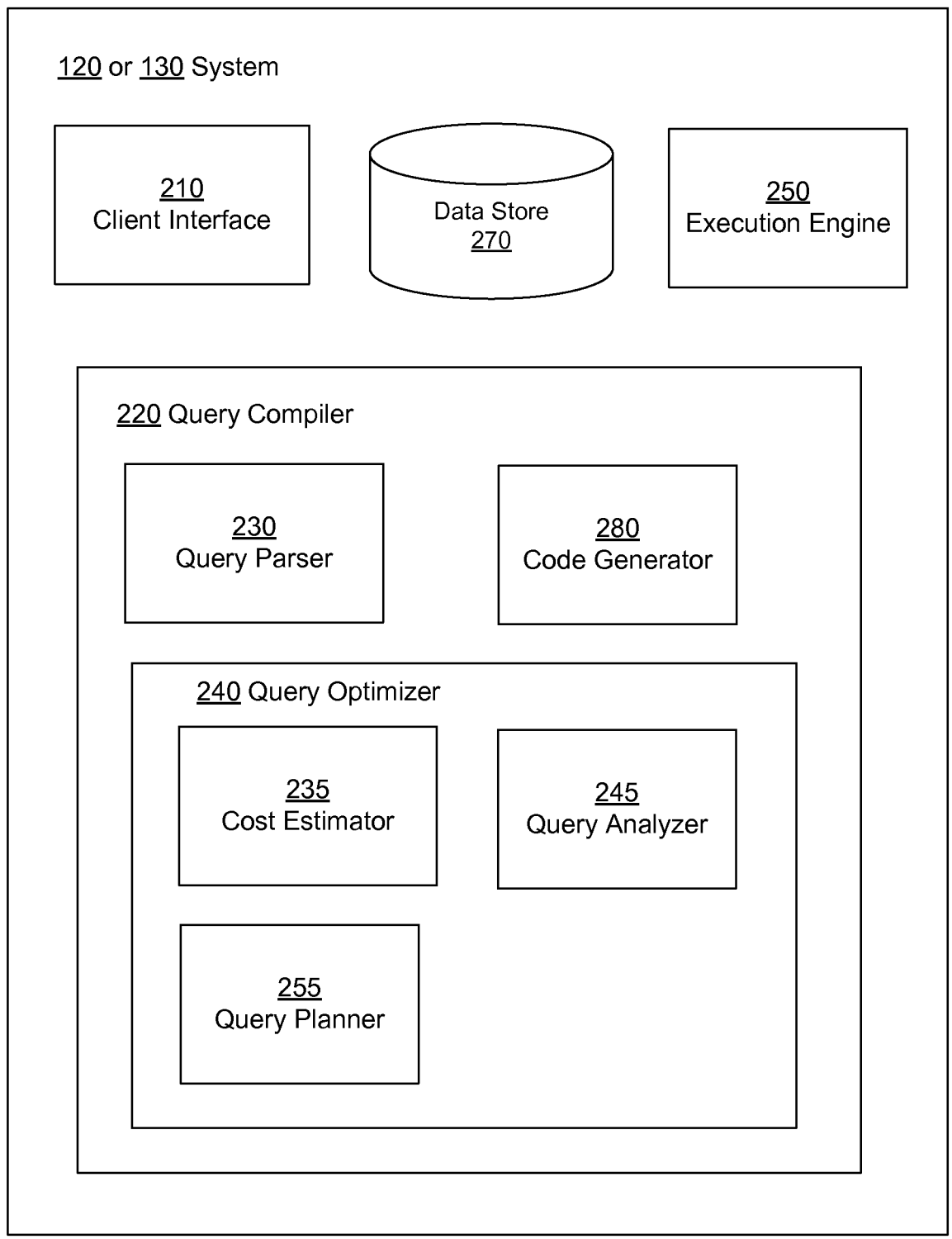
FIG. 2 is a high level block diagram illustrating the system architecture of a node 120, 130 of the database system, for example the leader node 120 or the compute node 130, in accordance with an embodiment.

FIG. 2 is a high level block diagram illustrating the system architecture of a node 120, 130 of the database system, for example the leader node 120 or the compute node 130, in accordance with an embodiment. The compute nodes implement a set of processes that manage communication with the leader node to receive commands, send back data, and route compiled code to individual query processes (for each core or slice on the compute node) to execute for a given query.

The node 120 or 130 comprises a client interface 210, a query compiler 220, an execution engine 250, and a data store 270. In alternative configurations, different and/or additional modules may be included in the system. The client interface 210 allows a node to interact with client devices 105. Typically the leader node 120 interacts with client devices 105. However compute nodes 130 may interact with external systems, for example, to import or export data. When a new client request comes in to perform a query or some other type of database operation, the system of node 120 spawns a new process to maintain session information for that client. That process is maintained as long as the client session remains open and that client is sending query requests to the leader node 120.

The data store 270 stores the data on a persistent storage, for example, a disk. This data includes relations or tables comprising rows and columns of user data. The query compiler 220 compiles each query to generate a plan for execution of the query and performs any optimizations needed. The query compiler 220 comprises components including a query parser 230, a query optimizer 240, and a code generator 280. The query parser 230 parses an input query to ensure that there are no syntax errors in the query. If a well formed query is provided to the system 120, the query parser 230 builds appropriate data structures to perform further processing of the query, for example, query optimization or code generation. The query optimizer 240 performs optimizations to ensure that a query runs fast.

In an embodiment, the query optimizer 240 comprises components including a query analyzer 245, a query planner 255, and a cost estimator 235. The query planner 255 generates a query plan for executing a query. The query planner 255 may generate a query plan by traversing through a search space comprising various execution plans applicable to a given query. The cost estimator 235 estimates costs of partial solutions and provides them to the query planner 255 to allow the query planner 255 to compare different partial solutions. The query analyzer 245 analyzes the complexity of each query or portions of queries e.g., subqueries. The query analyzer 245 provides a measure of complexity of a query or a portion of a query to the query planner 255 to allow the query planner 255 to determine a limit on the number of partial solutions that the query planner considers.

In an embodiment, the query planner 255 maintains a measure of cost for a goal. The query planner may track the lowest cost encountered while evaluating partial solutions for a goal. If the query planner 255 encounters a new partial solution that has higher cost than a previous cost encountered for another partial solution, the query planner 255 skips the new partial solution. The new partial solution is skipped because a lower cost solution is already found. Accordingly, these embodiments are based on a greedy strategy.

In an embodiment, the query planner 255 uses a mechanism to identify information describing partial solutions previously encountered. For example, the query planner may use a hash function to identify each partial solution using the hash value generated from attributes of the partial solution. As a result, if a request is received to process a partial solution that was previously processed, the query planner 255 fetches the result previously processed using the hash function without having to recompute the partial solution again.

In an embodiment, the query planner 255 determines a number of feasible joins based on logical equivalence classes rather than individual join expressions. The number of feasible joins may be considered as the minimum number of join expressions required to represent the entire logical search space of a given query. For certain queries having a specific structure the query planner 255 may determine the number of feasible joins based on the query structure rather than by performing join enumeration. For example, a star shaped query has a well defined structure comprising a fact table joined to several dimension tables. Based on the structure of the star-shaped query, the number of feasible joins of the start-shaped query with n tables can be determined to be $(n-1)*2^{(n-2)}$.

If the query structure is not one of the predefined structure for which number of feasible joins can be estimated based on the structure, the query planner 255 determines the number of feasible joins by performing join enumeration. The join enumeration may be performed by performing an ordered traversal of a connected graph representing the joins of the database query. The connected graph comprises nodes corresponding to each table joined and edges corresponding to pairs of tables that are joined in the query. In an embodiment, the estimation of the number of feasible joins of a query is performed before physical mapping begins.

The number of feasible joins is used by the cost estimator 235 to estimate the complexity of a query. In general, the higher the number of feasible joins of a query, the higher the complexity of the query. In an embodiment, the query planner 255 maps different ranges of measures of complexity of queries to different partial solution limits. For example, if the measure of complexity of queries is less than or equal to a first threshold value, there is no limit on the number of partial solutions. However, if the measure of complexity is greater than the first threshold value but less than or equal to a second threshold value, a second partial solutions limit is applied. The second partial solutions limit is less than the first partial solutions limit.

The cost estimator 235 may use the number of feasible joins as a measure of complexity. The following is a table that may be used by the query planner 255 for determining partial solutions limits for different ranges of queries based on number of feasible joins of the queries.

| Lower Bound of number of feasible joins | Upper Bound of number of feasible joins | Partial Solutions Limits |
| --- | --- | --- |
| 0 | N1 | No limit |
| N1 | N2 | Limit1 |
| N2 | N3 | Limit2 |
| N3 | undefined | Limit3 |

As described in the table above, if the number of feasible joins of a query is >0 but <=N1, there is no partial solutions limit applied to the query. If the number of feasible joins of a query is >N1 but <=N2, the partial solutions limit value is Limit1. If the number of feasible joins of a query is >N2 but <=N3, the partial solutions limit value is Limit2. If the number of feasible joins of a query is >N3, the partial solutions limit value is Limit3. Note that in the above table, 0<N1<N2<N3. On the other hand, the values of partial solutions limits decrease as the number of feasible joins increases. In other words, Limit1>Limit2>Limit3. As an example, values of above variables can be as follows: N1=448, N2=1024, and N3=11264. The various ranges may be determined based on a worst case estimate for the number of feasible joins for a given number of tables being joined.

In an embodiment, the partial solutions limits for various ranges of measures of query complexity are configured by a user, for example, defined as system variables by system administrators. In one embodiment, the system administrator defines a single system variable associated with partial solutions limits and the values of partial solution limits for different ranges of measures of query complexity are derived from the system variable. For example, a system administrator may define a variable called "partial_solutions_limit_per_goal" to have value 10. The query optimizer determines the values of Limit1, Limit2, and Limit3 from this system variable. For example, value of Limit1 is same as that of the system variable partial_solutions_limit_per_goal, the value of Limit2 is equal to the value of system variable partial_solutions_limit_per_goal minus 2, and the value of Limit3 is equal to the value of system variable partial_solutions_limit_per_goal minus 4.

In some embodiments, the query planner applies partial solutions limits to sets of applicable partial solutions by ordering the partial solutions by their ranks. The query planner 255 truncates the set to the maximum number of partial solutions based on the partial solutions limit. This allows the query planner 255 to keep the highest ranking partial solutions for processing.

In an embodiment, the query planner 255 assigns a number of partial solutions for each physical operator when the partial solution sets are truncated. For example, the query planner 255 may assign the highest ranked MAX/N partial solutions for each physical operator, where MAX is the partial solutions limit and N is the number of distinct physical operators appearing in the partial solutions set. Examples of physical operators include various types of joins, for example, hash join, merge join, etc. This ensures that the top ranked partial solutions for each applicable physical operator in the partial solution set are considered. For example, some partial solutions based on merge joins are includes, some partial solutions based on hash joins are included and so on. As a result, all selected partial solutions are not limited to a particular physical operator.

Execution of a Query in the Parallel Database System

The following steps detail the high-level operations that take place in processing a client request from its initial creation to sending results or status back to the client, to complete the request. After creating a process to maintain the connection with a new client, the system 100 routes the requested operation (a SQL query or some other database operation) through the parser and optimizer to develop a query execution plan to perform or execute the specified query or database operation.

Figure 3:
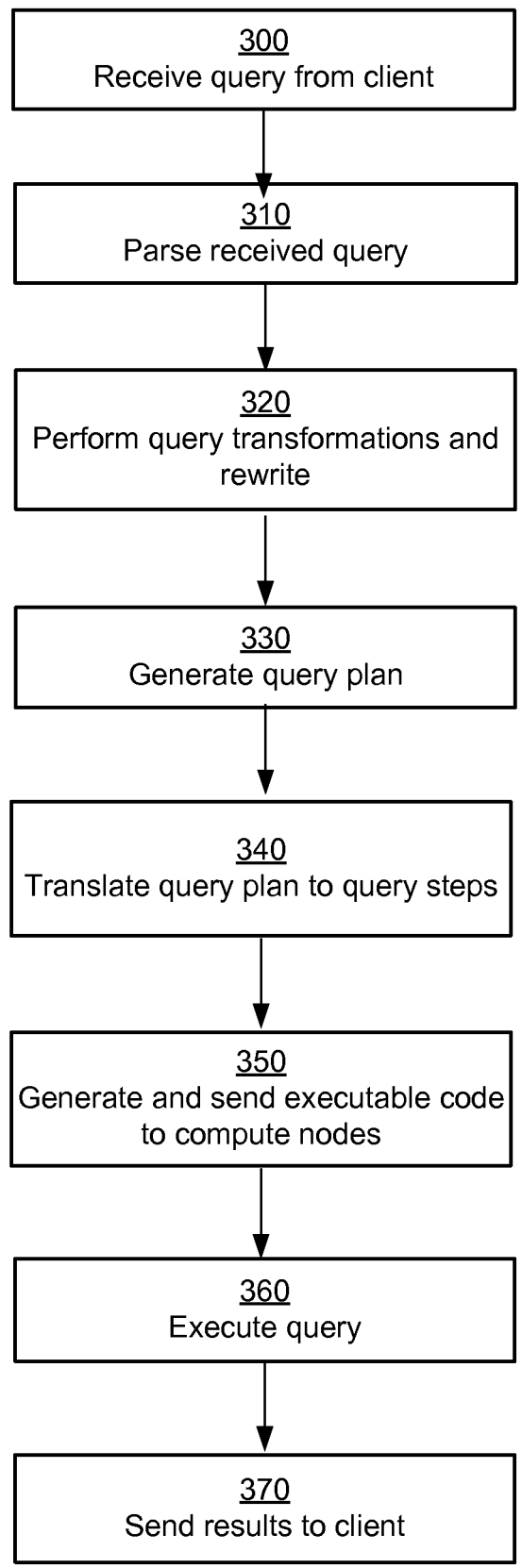
FIG. 3 shows a flowchart for illustrating the processing of a query in the database system, in accordance with an embodiment.

FIG. 3 shows a flowchart for illustrating the processing of a query in the parallel database, in accordance with an embodiment. These steps may be performed in orders other than those shown in FIG. 3. Furthermore, each step of the flowchart can be performed by modules different from those indicated below.

The leader node 120 receives 300 a database query from a client 105, for example, an SQL query. The query parser 230 parses 310 the query received to generate a data structure representing the query. The query optimizer 240 performs 320 various transformations on the query, for example, by rewriting the query. The query planner 255 generates 330 a physical query plan for the input query. The physical query plan may specify execution choices, such as join type, join order, aggregation options, and data distribution requirements. The execution engine 250 translates 340 the physical plan into sequences of query steps. The execution engine 250 generates 350 and sends executable code to various compute nodes.

Each compute node executes 360 the query for the portion of data present on the compute node. Each compute node may be considered divided into slices, typically one slice per core or processor. Each slice is associated with a portion of data that is processed by the slice. The slices on each node share the server's memory and disk space to parallelize the workload for a query or other database operation sent to all the compute node servers. Each compute node 130 includes a communication layer for communicating, for example, with the leader node and a dispatcher that assigns a particular query task to corresponding slice query processes available to perform queries within each compute node. Each slice can have a pool of separate processes that can independently run compiled query code for a slice of data associated with a query task or other database operation. Additional leader and compute node communication processes handle the transfer of commands and data back and forth between the leader node 120 and compute nodes 130 associated with the execution of specific query tasks. The compute nodes determine the result of execution of the query and communicate the result to the leader node. The leader node receives the results and sends 370 the results to the client that sent the query.

In an embodiment each query step corresponds to operators in query plans. Examples of query steps include, HASH, which builds hash table for use in hash joins, HJOIN, which executes hash join of two tables or intermediate result sets, MERGE, which merges rows derived from parallel sort or join operations, SCAN, which scans tables or intermediate result sets, either sequentially or with a range-restricted scan, SORT, which sorts rows or intermediate result sets as required by other subsequent operations (such as joins or aggregations) or to satisfy an ORDER BY clause, DIST, which distributes rows to nodes for parallel joining purposes or other parallel processing, and NLOOP, which executes a nested-loop join of two tables or intermediate result. Embodiments allow a user to use a command, for example, "explain" command that provides a description of the query plan generated.

Partial Solution Limits

Figure 4:
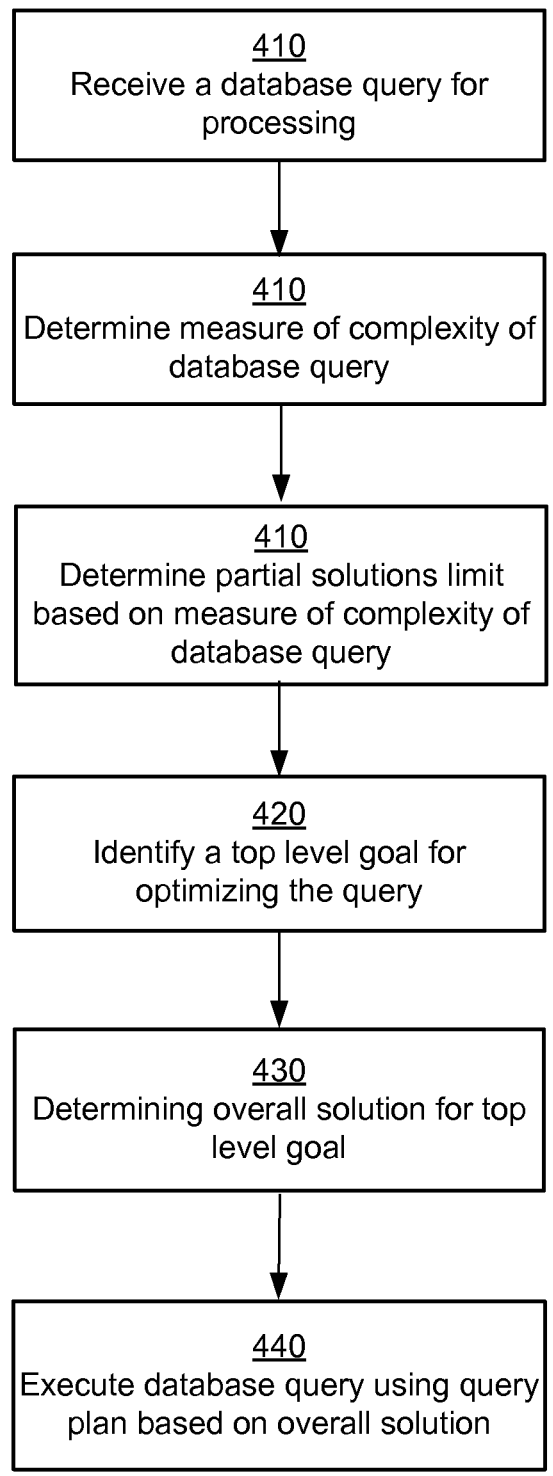
FIG. 4 shows a flowchart for illustrating the process of optimizing a query based on partial solutions limits, in accordance with an embodiment.

FIG. 4 shows a flowchart for illustrating the process of optimizing a query based on partial solutions limits, in accordance with an embodiment. The query optimizer 240 receives 410 a database query for optimizing. The cost estimator 235 determines 420 a measure of complexity of the database query, for example, based on the number of feasible joins of the query. The query planner 255 determines the value of the partial solutions limit based on the measure of the complexity of the database query. In an embodiment, the value of the partial solutions limit is determined to be a value inversely proportional to the measure of complexity of the database. In other words, more complex queries may be assigned lower partial solutions limits compared to less complex queries.

The query planner 255 determines 430 a top level goal for the database query. The solution to the top level goal is the overall solution to the database query which can be used to generate the query plan for executing the database query. The query planner 255 may determine sub-goals of the top level goal and determine partial solutions of the sub-goals. The query planner 255 combines the partial solutions of the sub-goals to determine the overall solution for the top level goal. The query planner 255 generates a query plan based on the overall solution and provides the query plan for execution to the execution engine 250. The execution engine 250 executes 440 the database query using the query plan (or execution plan) obtained from the query planner 255.

An example of a goal is to perform the join of two tables t1 and t2. This goal itself may be a sub-goal of a higher goal of joining multiple tables. The sub-goals may comprise determining the distribution of each individual table. Accordingly, the goal of joining tables t1 and t2 is performed by performing two sub-goals, the first sub-goal comprising determining the distribution of table t1 and the second sub-goal comprising determining the distribution of table t2. Partial solutions limits are applied when solving for each sub-goal. In other words, the number of candidate partial solutions considered for each sub-goal/goal is limited by the value of the partial solutions limit. When the two sub-goals are solved, the distributions of the two tables are determined. As a result, the goal of performing the join may be solved by determining the algorithm used for performing the join. For example, the query planner may consider various algorithms including merge join, nested loop join, hash join etc. Accordingly, combining the partial solutions of sub-goals to a partial or complete solution of a goal may require considering various alternatives. The partial solution limit is applied to the step of combining the partial solutions of sub-goals. The query planner may only consider the candidate partial solutions that are applicable in a given context based on the values of the other parameters. For example, if the distribution of the tables being joined has is given, certain join algorithms may not be suitable. Accordingly, the planner eliminates these possibilities and evaluates only the candidate partial solutions that are reasonable in the given situation.

Figure 5:
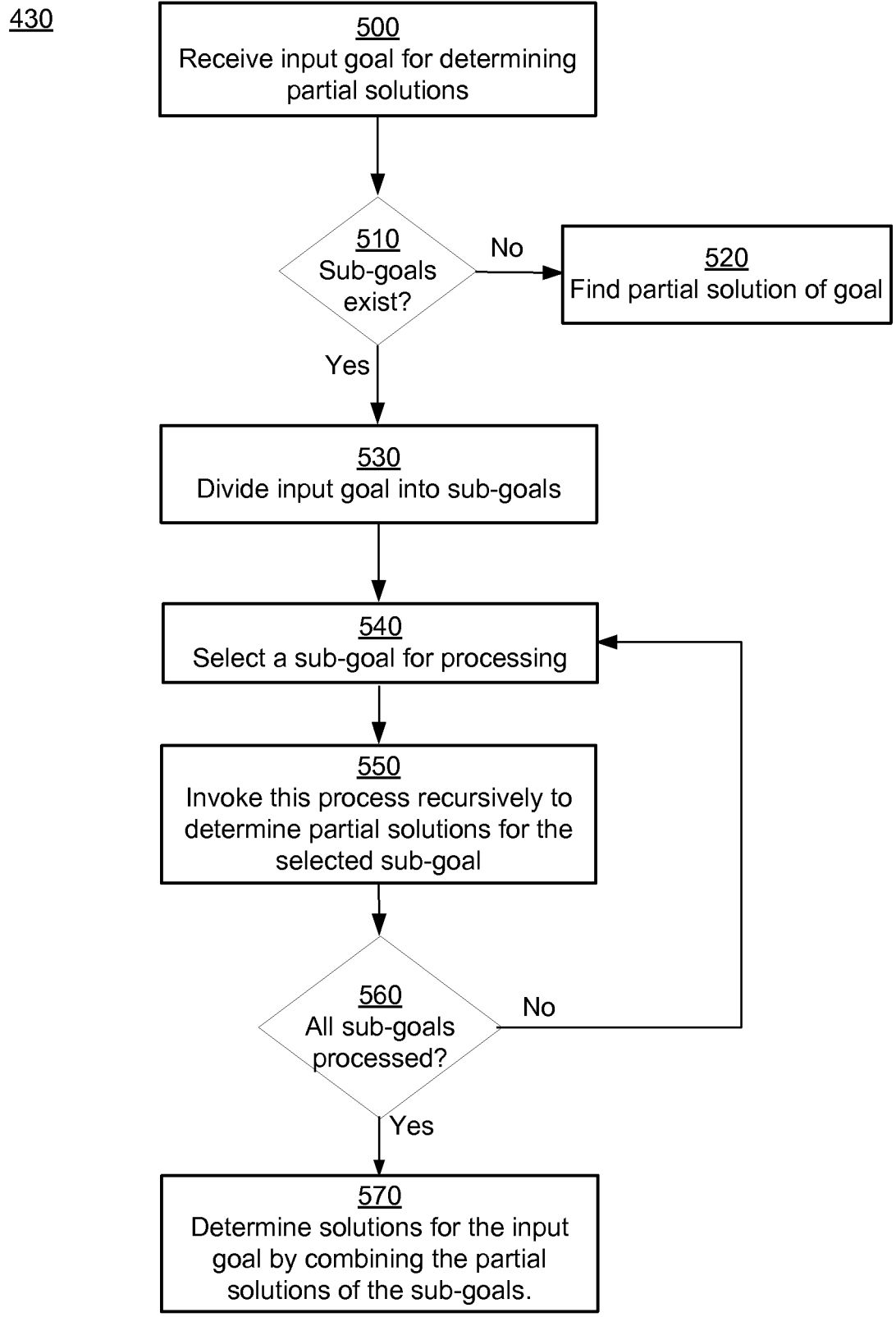
FIG. 5 shows a flowchart for illustrating the process of determining partial solutions for a goal or a sub-goal, in accordance with an embodiment.

The process of determining 430 the overall solution for the top level goal is described in further detail in FIG. 5. FIG. 5 shows a flowchart for illustrating the process of determining partial solutions for a goal or a sub-goal, in accordance with an embodiment. Accordingly, the flowchart of FIG. 5 can be considered as providing the details of the step 430 of FIG. 4.

The query planner 255 receives 500 an input goal for determining partial solutions for the input goal. The query planner 255 determines 510 if the goal needs to be subdivided into sub-goals or there is no need to sub-divide the goal and the goal can be directly solved for partial solutions. If there is no need to sub-divide the input goal into sub-goals, the query planner 255 finds 520 the partial solution for the goal that is expected to return the best overall solution. The query planner 255 considers the partial solutions limit to limit the number of alternatives considered in finding 520 the partial solution for the goal.

If the query planner 255 determines 510 that the goal can be further sub-divided into smaller sub-goals the query planner 255 divides 530 the input goal into sub-goals. For example, if the input goal is to optimize a join involving a large set of tables, the sub-goals may correspond to optimizing joins of subsets of the set of tables. Optimizing the joins may involve determining a join order for the subset of tables. The join orders of the subsets of tables may be combined to determine the join order for the set of tables.

The query planner 255 selects 540 a sub-goal for processing. The query planner 255 recursively invokes 550 the process of FIG. 5 to find the partial solution corresponding to the selected sub-goal. The recursive process provides the sub-goal as an input to a new invocation of the process of FIG. 5. Some embodiments may implement the process in an iterative fashion (i.e., non-recursive fashion), for example, by keeping track of data corresponding to various invocations on a data structure, e.g., a stack.

The query planner 255 determines 560, if all the sub-goals corresponding to the input goal are processed. If there are sub-goals that are still remaining, the query planner 255 repeats the steps 540, 550, 560 for each of the remaining sub-goals. For each sub-goal, the invocation of the process of FIG. 5 returns a partial solution. If the query planner 255 determines 560 that there are no remaining sub-goals, the query planner 255 determines 570 the partial solution for the input goal by combines the partial solutions corresponding to each sub-goal. If there are various ways in which the partial solutions may be combined, the query planner 255 may limit the number of ways of combining the partial solutions by the partial solutions limit.

Figure 6:
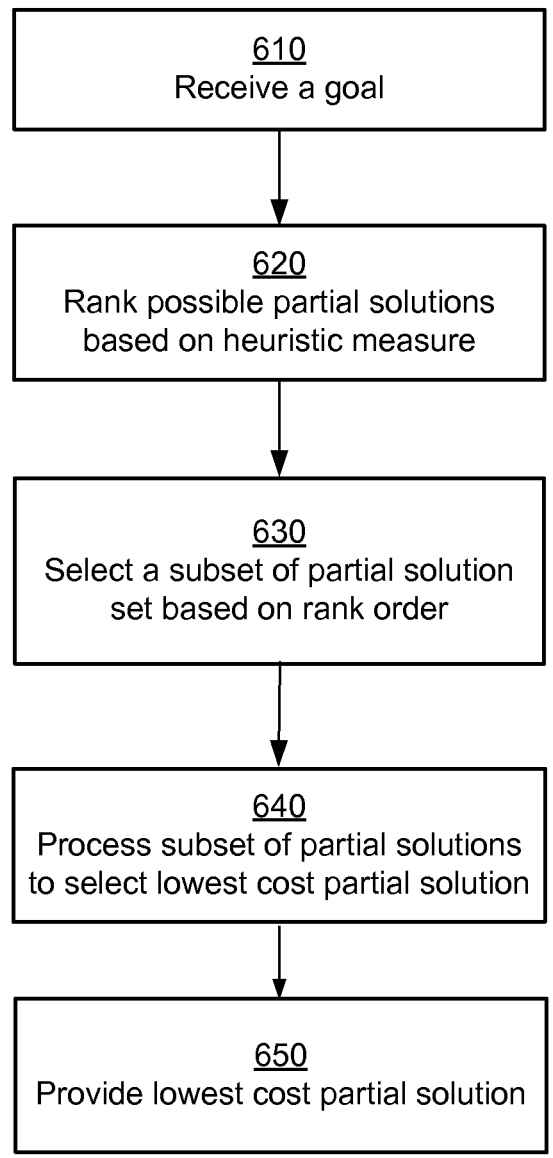
FIG. 6 shows a flowchart for illustrating the process of limiting the number of partial solutions processed for a goal or a sub-goal, in accordance with an embodiment.

FIG. 6 shows a flowchart for illustrating the process of limiting the number of partial solutions processed for a goal or a sub-goal, in accordance with an embodiment. Accordingly, the flowchart of FIG. 6 can be considered as providing the details of the steps 520 or 570 of FIG. 5. The query planner 255 receives 610 a goal for processing, for example, while processing the flow chart of FIG. 5. The query planner 255 identifies possible partial solutions for determining a solution of the input goal and ranks 620 them. The query planner 255 ranks 620 the partial solutions based on heuristic estimates of the quality of the partial solutions. For example, the rank may be based on a heuristic measure of how likely the partial solution is to lead to the plan with the lowest cost. The set of partial solutions is referred to as the partial solution set.

The query planner 255 selects 630 a subset of the partial solution set based on the rank order of the partial solution set. The number of elements of the partial solution set selected in the subset is determined by the partial solution limit. In other words, the query planner 255 selects the top ranking partial solutions. The query planner 255 processes the partial solutions in the subset to determine the lowest cost partial solution.

The cost of a partial solution reflects the cost of processing the query if the partial solution was selected. The cost of a partial solution may be determined based on various factors including the number of page reads that are likely to be performed while processing the query if the partial solution was selected, the amount of resources likely to be used for processing the query if the partial solutions were used including processing (CPU), memory, and input/output resources. The selected partial solution is estimated by the query planner 255 to provide the best overall query plan. The query planner 255 provides 650 the lowest cost partial solution from the subset to the caller of the process of FIG. 6, for example, step 520 of the process of FIG. 5.

In an embodiment, each goal is associated with a cost bound. The query planner selects only partial solutions that provide a cost that is less than the given bound. If a partial solution is determined to have a cost higher than the bound, that partial solution is eliminated. For example, assume that a goal g has a bound of N and there are two sub-goals, sg1 and sg2. All partial solutions of sg1 and sg2 that have cost higher than N are eliminated because they are going to result in an overall cost that is higher than the bound. Further assume that the cost of a partial solution selected by the query planner for sg1 is M, where M<N. All partial solutions of sg2 that have a cost higher than N-M are eliminated by the query planner because the overall cost of the goal based on the cost of sg1 and sg2 would be higher than the bound N. In these examples, the query planner would also consider the cost associated with the goal that combines the partial solutions of sub-goals since the goal itself may correspond to operators (e.g., join operator, sort operator, etc.) of the query plan having a cost measure.

In general each goal is associated with a set of constraints. For example, a constraint may specify distribution of data for a table, result of the query or subquery or any intermediate result generated while processing the database query, an order of an intermediate or final result, and so on. These constraints are considered while selecting the sub-goals. For example, if a candidate partial solution for a sub-goal is likely to violate a constraint of the goal, the candidate partial solution is eliminated. Also, if a given combination of partial solutions violates a constraint of the goal, the combination of partial solutions is eliminated. The combination of partial solutions may be eliminated by considering an alternative partial solution for at least one of the sub-goals.

Alternative Applications

Several embodiments are described herein using a parallel database architecture. However, other embodiments based on a single processor architecture are foreseeable. Furthermore, although the parallel architecture is disclosed herein as having a leader node and a plurality of compute nodes, other parallel configurations can be used. For example, any one of the compute nodes can act as a leader node. The parallel architecture can be based on a shared memory. Alternatively, the parallel architecture may comprise a distributed system of independent computers interconnected via a network.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

We claim:

1. A computer-implemented method of physical planning of database queries, comprising:

receiving a database query including a plurality of portions;

receiving a request for generating an execution plan for the database query including the plurality of portions;

generating the execution plan for execution of the database query, comprising:

identifying the plurality of portions of the database query, wherein each portion of the database query is associated with one or more partial execution plans, each partial execution plan represents an execution plan for the portion of the database query and comprises one or more physical operators, and wherein each physical operator implements a database operation for producing an output data set from one or more input data sets;

determining a threshold number of partial execution plans for the database query based on a measure of complexity of the database query, the measure of complexity of the query representing an estimate of a number of feasible joins of the database query, the estimate determined based on at least one of: (1) a structure of the database query or (2) a join enumeration performed using an ordered traversal of a graph representation of the database query, the threshold number limiting a number of candidate partial execution plans evaluated to determine a partial execution plan for each portion of the database query, the threshold number determined to be a value inversely proportionate to the measure of complexity of the database query;

determining a plurality of partial execution plans for execution of the database query by evaluating the number of candidate partial execution plans for each portion of the database query, each partial execution plan corresponding to a portion of the database query; and combining the plurality of partial execution plans to generate the execution plan;

and executing the database query by executing the execution plan.

2. The computer-implemented method of claim 1, further comprising:

maintaining an estimate of cost based on partial execution plans processed for a goal; and responsive to encountering a new partial execution plan having a cost greater than a cost of a partial execution plan previously processed for the goal, determining not to process the new partial execution plan.

3. The computer-implemented method of claim 1, wherein determining the plurality of partial execution plans comprises:

for each of the plurality of partial execution plans:
identifying a set of candidate partial execution plans; and
selecting a subset of the set of candidate partial execution plans, the size of the subset determined based on the threshold number.

4. The computer-implemented method of claim 3, wherein selecting a subset of the set of candidate partial execution plans comprises:

ranking the set of candidate partial execution plans based on a cost estimate for each candidate partial execution plans; and selecting a subset of highest ranked candidate partial execution plans from the set of partial execution plans.

5. The computer-implemented method of claim 3, wherein selecting a subset of the set of candidate partial execution plans comprises:

ranking the set of partial execution plans based on a cost estimate for each candidate partial execution plans; and selecting a plurality of subsets of partial execution plans from the set of partial execution plans, each subset corresponding to a physical operator wherein each subset comprises the highest ranked partial execution plans corresponding to the physical operator.

6. The computer-implemented method of claim 1, further comprising:

determining the measure of complexity of the database query to be higher for database queries with higher number of feasible joins.

7. The computer-implemented method of claim 1, wherein the graph representation of the database query comprises a join graph of the database query, wherein the join graph of the database query comprises nodes corresponding to tables of the database query and edges corresponding to pairs of tables, each pair corresponding to tables joined by the database query.

8. The computer-implemented method of claim 1, further comprising:

maintaining a goal comprising a logical expression from the database query and a cost bound for the goal.

9. The computer-implemented method of claim 8, wherein the goal further comprises one or more constraints, wherein the sub-goals are selected so as to satisfy the constraints of the goal.

10. The computer-implemented method of claim 9, wherein a constraint specifies a distribution of data across a plurality of processors for a table processed by the database query or an intermediate result generated by the database query.

11. The computer-implemented method of claim 8, further comprising:

determining cost measures of partial execution plans corresponding to sub-goals for the goal; and eliminating a sub-goal responsive to determining that the sum of cost measures of the sub-goals determined so far exceeds the cost bound of the goal.

12. The computer-implemented method of claim 8, wherein the goal further comprises one or more physical properties of data sets processed by the database query, the data sets comprising one of a table processed by the goal, an intermediate result, or a result returned by the database query.

13. The computer-implemented method of claim 1, further comprising:

maintaining a mapping from ranges of measures of query complexity to threshold numbers; and determining a measure of query complexity for a new database query; and determining the threshold number for the database query by selecting the value of limit from the range corresponding to the measure of query complexity for the new database query.

14. The computer-implemented method of claim 1, further comprising:

maintaining a mapping from ranges of number of feasible joins of database queries to threshold numbers; and determining a number of feasible joins for a new database query; and determining the threshold number for the database query by selecting the value of threshold number from the range corresponding to the number of feasible joins for the new database query.

15. A non-transitory computer readable storage medium storing instructions thereon, the instructions comprising, instructions for:

receiving a database query including a plurality of portions;

receiving a request for generating an execution plan for the database query including the plurality of portions;

generating the execution plan for execution of the database query, comprising:
identifying the plurality of portions of the database query, wherein each portion of the database query is associated with one or more partial execution plans, each partial execution plan represents an execution plan for the portion of the database query and comprises one or more physical operators, and wherein each physical operator implements a database operation for producing an output data set from one or more input data sets;
determining a threshold number of partial execution plans for the database query based on a measure of complexity of the database query, the measure of complexity of the query representing an estimate of a number of feasible joins of the database query, the estimate determined based on at least one of: (1) a structure of the database query or (2) a join enumeration performed using an ordered traversal of a graph representation of the database query, the threshold number limiting a number of candidate partial execution plans evaluated to determine a partial execution plan for each portion of the database query, the threshold number determined to be a value inversely proportionate to the measure of complexity of the database query;
determining a plurality of partial execution plans for execution of the database query by evaluating the number of candidate partial execution plans for each portion of the database query, each partial execution plan corresponding to a portion of the database query; and
combining the plurality of partial execution plans to generate the execution plan;
and
executing the database query by executing the execution plan.

16. The non-transitory computer readable storage medium of claim 15, wherein instructions for determining the plurality of partial execution plans comprise instructions for:
for each of the plurality of partial execution plans:
identifying a set of candidate partial execution plans; and
selecting a subset of the set of candidate partial execution plans, the size of the subset determined based on the threshold number.

17. The non-transitory computer readable storage medium of claim 15, wherein the stored instructions further comprise instructions for:
determining the measure of complexity of the database query.

18. The non-transitory computer readable storage medium of claim 15, wherein the stored instructions further comprise instructions for:
maintaining a mapping from ranges of measures of query complexity to threshold numbers; and
determining a measure of query complexity for a new database query; and
determining the threshold number for the database query by selecting the value of limit from the range corresponding to the measure of query complexity for the new database query.

19. The non-transitory computer readable storage medium of claim 15, wherein the stored instructions further comprise instructions for:
maintaining a goal comprising a logical expression from the database query and a cost bound for the goal.

20. The non-transitory computer readable storage medium of claim 19, wherein the goal further comprises one or more constraints, wherein the sub-goals are selected so as to satisfy the constraints of the goal.

21. The non-transitory computer readable storage medium of claim 20, wherein a constraint specifies a distribution of data across a plurality of processors for a table processed by the database query or an intermediate result generated by the database query.

22. The non-transitory computer readable storage medium of claim 19, further comprising:
determining cost measures of partial execution plans corresponding to sub-goals for the goal; and
eliminating a sub-goal responsive to determining that the sum of cost measures of the sub-goals determined so far exceeds the cost bound of the goal.

23. The non-transitory computer readable storage medium of claim 19, wherein the goal further comprises one or more physical properties of data sets processed by the database query, the data sets comprising one of a table processed by the goal, an intermediate result, or a result returned by the database query.

24. A computer-implemented system for physical planning of database queries, the system comprising:
a computer processor; and
a non-transitory computer-readable storage medium storing instructions thereon, the instructions comprising:
receiving a database query including a plurality of portions;
receiving a request for generating an execution plan for the database query including the plurality of portions;
generating the execution plan for execution of the database query, comprising:
identifying the plurality of portions of the database query, wherein each portion of the database query is associated with one or more partial execution plans, each partial execution plan represents an execution plan for the portion of the database query and comprises one or more physical operators, and wherein each physical operator implements a database operation for producing an output data set from one or more input data sets;
determining a threshold number of partial execution plans for the database query based on a measure of complexity of the database query, the measure of complexity of the query representing an estimate of a number of feasible joins of the database query, the estimate determined based on at least one of: (1) a structure of the database query or (2) a join enumeration performed using an ordered traversal of a graph representation of the database query, the threshold number limiting a number of candidate partial execution plans evaluated to determine a partial execution plan for each portion of the database query, the threshold number determined to be a value inversely proportionate to the measure of complexity of the database query;
determining a plurality of partial execution plans for execution of the database query by evaluating the number of candidate partial execution plans for each portion of the database query, each partial execution plan corresponding to a portion of the database query; and
combining the plurality of partial execution plans to generate the execution plan;
and executing the database query by executing the execution plan.

25. The non-transitory computer readable storage medium of claim 16, wherein instructions for selecting a subset of the set of candidate execution plans comprise instructions for:
   ranking the set of candidate partial execution plans based on a cost estimate for each candidate partial execution plans; and
   selecting a plurality of subsets of partial execution plans from the set of partial execution plans, each subset corresponding to a physical operator wherein each subset comprises the highest ranked partial execution plans corresponding to the physical operator.

* * * * *